(12) United States Patent
Tang et al.

(10) Patent No.: US 9,288,775 B2
(45) Date of Patent: Mar. 15, 2016

(54) REAL-TIME IMPROVEMENT METHOD AND APPARATUS FOR DISTRIBUTED NETWORK RADIO FREQUENCY PERFORMANCE

(75) Inventors: Xiaojian Tang, Guangdong Province (CN); Bojing Yang, Guangdong Province (CN)

(73) Assignee: ZTE Corporation, Nanshan District, Shenzhen Guangdon Province (CN)

( * ) Notice: Subject to any disclaimer, the term of this patent is extended or adjusted under 35 U.S.C. 154(b) by 264 days.

(21) Appl. No.: 13/878,679

(22) PCT Filed: Jun. 16, 2011

(86) PCT No.: PCT/CN2011/075833
§ 371 (c)(1),
(2), (4) Date: Apr. 10, 2013

(87) PCT Pub. No.: WO2012/048580
PCT Pub. Date: Apr. 19, 2012

(65) Prior Publication Data
US 2013/0210479 A1    Aug. 15, 2013

(30) Foreign Application Priority Data

Oct. 11, 2010 (CN) .......................... 2010 1 0502450

(51) Int. Cl.
*H04W 52/22* (2009.01)
*H04W 52/52* (2009.01)

(52) U.S. Cl.
CPC ............ *H04W 52/52* (2013.01); *H04W 52/223* (2013.01)

(58) Field of Classification Search
CPC .... H04W 52/04; H04W 52/52; H04W 52/223
See application file for complete search history.

(56) References Cited

U.S. PATENT DOCUMENTS

| 7,103,029 B1 * | 9/2006 | Minowa .................... 370/342 |
| 2006/0035660 A1 * | 2/2006 | Anderson .................. 455/522 |

(Continued)

FOREIGN PATENT DOCUMENTS

| CN | 101136670 A | 3/2008 |
| KR | 20070040642 A | 4/2007 |
| WO | 2009078762 A1 | 6/2009 |

OTHER PUBLICATIONS

International Search Report and Written Opinion for PCT/CN2011/075833 mailed Sep. 29, 2011.

(Continued)

*Primary Examiner* — Wesley Kim
*Assistant Examiner* — Dong-Chang Shiue
(74) *Attorney, Agent, or Firm* — Brian J. Colandreo; Michael T. Abramson; Holland & Knight LLP

(57) ABSTRACT

A real-time improvement method and a real-time improvement apparatus for a distributed network radio frequency performance are provided by the present invention. The method comprises: a data analysis unit receiving an input power, an output power and a link gain from a base station element node with a radio frequency module, and establishing a learning model of the base station element node according to the input power, the output power and the link gain; the data analysis unit obtaining an expected output power corresponding to the input power according to a correlation between a preset input power and the expected output power; in the learning model, regulating the link gain according to a difference value between the expected output power and the output power, until the difference value between the output power of the learning model and the expected output power reaches a preset range, and determining the link gain at this moment as a new link gain; and the data analysis unit sending the new link gain to the base station element node with a radio frequency module, and the base station element node regulating the link gain thereof according to the new link gain.

9 Claims, 4 Drawing Sheets

(56) References Cited

U.S. PATENT DOCUMENTS

2010/0191837 A1* 7/2010 Linden et al. .................. 709/220
2011/0014875 A1* 1/2011 Chao et al. ................... 455/63.1
2011/0319120 A1* 12/2011 Chen et al. .................... 455/522

OTHER PUBLICATIONS

International Preliminary Report on Patentability for PCT/CN2011/075833 mailed Apr. 25, 2013.

* cited by examiner

US 9,288,775 B2

REAL-TIME IMPROVEMENT METHOD AND APPARATUS FOR DISTRIBUTED NETWORK RADIO FREQUENCY PERFORMANCE

RELATED APPLICATION

The subject application is a U.S. National Stage application of International Application No. PCT/CN2011/075833, filed on Jun. 16, 2011, which claims the priority of Chinese Patent Application No. 201010502450.2, filed on Oct. 11, 2010, the contents of which are herein incorporated by reference in its entirety.

FIELD OF THE INVENTION

The present invention relates to distributed network systems, and in particular to a real-time improvement method and a real-time improvement apparatus for a distributed network radio frequency performance.

BACKGROUND OF THE INVENTION

Due to the modularized design feature of the distributed base station, the distributed base station has advantages of standardized interfaces, convenient addressing and convenient system extension and upgrade, which complies with the future development trend of the novel mobile networks. Especially, it is widely applied in Time Division Synchronous Code Division Multiple Access (TD-SCDMA) systems.

In the TD-SCDMA distributed networking scenario, as shown in FIG. 1, the TD-SCDMA distributed networking comprises a Base Band Unit (BBU) and a Radio Remote Unit (RRU), which are connected to each other via optical fiber or other means. In this case, the BBU is mainly used for realizing functions such as carrier frequency resource allocation, wireless link establishment, wireless link control, up/downlink signal modulation coding/decoding and so on in the TD-SCDMA systems; and the RRU is mainly used for transmitting an IQ modulation signal sent from the BBU as a TD-SCDMA air interface signal by a power amplifier unit through up-conversion, and for detecting and receiving a user signal, converting the user signal to an IQ modulation signal through down-conversion and sending the IQ modulation signal to the BBU for processing.

In the view of signal transformation, mobile communications rely on the transformation from baseband signals to radio frequency signals and the inverse process thereof. However, by taking the radio frequency performance as the measurement criteria of the radio frequency signal, the key performances of the mobile communication system are determined regarding aspects such as signal quality, signal coverage range, etc.

As to such Error Vector Magnitude (EVM) performance which can be described by an accurate mathematic model, the performance can be controlled well by improving the signal processing method regarding modulation and demodulation at the baseband side and improving peak cancellation processing at the radio frequency side, filter design, and so on, and the effects can last for a long time. Generally, the performance will not deteriorate with the change in the external environment over time.

However, as to some radio frequency performances, the mathematic models thereof usually are nonlinear and may have significant changes with the change in the external environment over time. As to the output power, in order to ensure the accuracy of the output of the air interface, the conventional approach is to carry out parameter measurement on a certain batch of power amplifiers by way of instrument measurement, approximately obtain a gain curve of the power amplifiers by way of the liner fitting method, and then store the curve in the format of table and so on; and the base station can call the relevant curve during operation, and then dynamically adjust and compensate to the output power, wherein the approach has the defects as follows.

First, since the gain curve is an average estimation of a certain batch of power amplifiers, the real gain feature of an individual power amplifier cannot be reflected accurately.

Second, since the conventional power control method is a model to carry out a rough adjustment using measurement experience values and then carry out a fine adjustment within in a small range. This method can only rely on the previously measured characteristic curves, and when the gain characteristic of the power amplifier itself has significant offset with the change in the external environment over time, this method cannot realize dynamic adjustments.

Therefore, such parameter as output power is easy to change randomly and dynamically with factors such as external environment, time, and so on, which result in that the radio frequency performance thereof is unstable, the accuracy of the power output of the air interface cannot be ensured, the signal modulation of the distributed base station is affected, and the distributed base station carries out the real-time adjustment on the radio frequency performance difficultly.

SUMMARY OF THE INVENTION

The main object of the present invention is to provide a real-time improvement method and a real-time improvement apparatus for a distributed network radio frequency performance, in which the link adjustment on the element node is determined by establishing a power model of an element node and adjusting a model parameter so as to carry out the real-time adjustment on the radio frequency performances and solve the problem that the radio frequency performance is instable when the parameter change randomly and dynamically with factors such as external environment, time, etc.

According to one aspect of the present invention, a real-time improvement method for a distributed network radio frequency performance is provided, comprising the steps of:

a data analysis unit receiving an input power, an output power and a link gain from a base station element node with a radio frequency module, and establishing a learning model of the base station element node according to the input power, the output power and the link gain;

the data analysis unit obtaining an expected output power corresponding to the input power according to a correlation between a preset input power and the expected output power;

in the learning model, regulating the link gain according to a difference value between the expected output power and the output power, until the difference value between the output power of the learning model and the expected output power reaches a preset range, and determining the link gain at this moment as a new link gain; and the data analysis unit sending the new link gain to the base station element node with a radio frequency module, and the base station element node regulating a link gain of the base station element node according to the new link gain.

In the above solution, the base station element node with the radio frequency module is a Radio Remote Unit (RRU) comprising a detection unit and a gain regulation unit.

the data analysis unit receiving the input power, the output power and the link gain from the base station element node with a radio frequency module and establishing the learning model of the base station element node according to the input power, the output power and the link gain comprises: the RRU detecting and collecting the input power, the output power and the link gain by way of the detection unit and sending the input power, the output power and the link gain to the data analysis unit; and the data analysis unit establishing the learning model of the RRU comprising an input layer, an intermediate layer and an output layer according to the input power, the output power and the link gain of the RRU.

In the above solution, in the learning model, regulating the link gain according to the difference value between the expected output power and the output power until the difference value between the output power of the learning model and the expected output power reaches a preset range and determining the link gain at this moment as a new link gain comprises: if the difference value between the output power and the expected output power in the learning model is not within a preset range, then regulating the link gain in the learning model and updating the node weights of the input layer, the intermediate layer and the output layer in the learning model, until the difference value between the output power and the expected output power in the learning model is within the preset range, and determining the link gain at this moment as the new link gain.

In the above solution, the data analysis unit sending the new link gain to the base station element node with a radio frequency module, and the base station element node regulating the link gain thereof according to the new link gain comprises: the data analysis unit sending the determined new link gain to the RRU, and the RRU initiating a gain regulation unit to regulate a downlink radio frequency gain according to a value of the new link gain.

In the above solution, the method further comprises: the data analysis unit collecting connection location relationship information and node production batch information about the base station element node with the radio frequency module.

In the above solution, after determining the new link gain, further comprising:

the base station element node with the radio frequency module regulating the link gain according to the new link gain; and the data analysis unit receiving a new output power of the base station element node, and comparing and analyzing a difference value between the new output power and the expected output power, and if the difference value is within a preset range, then the data analysis unit updating power sample information and a corresponding link gain parameter of the base station element node stored by the base station according to the connection location relationship about the base station element node.

In the above solution, after if the difference value is within the preset range, then updating the power sample information and the corresponding link gain parameter of the base station element node stored by the base station according to the connection location relationship about the base station element node, further comprising: a counting unit performing quality tracking on the base station element node by counting a change situation of the link gain parameter of the base station element node in each production batch.

According to another aspect of the present invention, the present invention also provides a real-time improvement apparatus for a distributed network radio frequency performance, comprising: a data analysis unit comprising a receiving module, a determination module, a regulation module and a sending module, wherein the receiving module is configured to receive an input power, an output power and a link gain from a base station element node with a radio frequency module, and establish a learning model of the base station element node according to the input power, the output power and the link gain;

the determination module is configured to obtain an expected output power corresponding to the input power received by the receiving module according to a correlation between a preset input power and the expected output power;

the regulation unit, is configured to, in the learning model established by the receiving module, regulate the link gain according to a difference value between the expected output power and the output power obtained by the determination module, until the difference value between the output power of the learning model and the expected output power reaches a preset range, and the link gain at this moment is determined as a new link gain; and the sending module is configured to send the new link gain determined by the regulation unit to the base station element node with a radio frequency module, which regulates a link gain of the base station element node according to the new link gain.

In the above solution, the apparatus further comprises:

a counting unit, configured to perform quality tracking on the base station element node by counting a change situation of the link gain parameter of the base station element node in each production batch.

The beneficial effects of the present invention compared with the related art are as follows:

1. In the present invention, under the premise of not changing the networking manner of the base station and not changing the basic processing method of the existing power correction and the real-time thereof, acquisition and data processing are carried out on the existing information, the characteristic of the base station element node, especially the element node with a radio frequency module, is estimated and adjusted dynamically, and the difference value between the output power and the expected power is within the preset range, the accuracy of the output of the air interface is ensured.

2. The present invention can count the difference value between the output power and the expected power by collecting a plurality of sample parameters such as input power, temperature, frequency, etc., and enable the output power to be within the expected range by adjusting the link gain, realizing the multi-parameter real-time adjustment of the radio frequency indicator.

3. The present invention can not only improve the radio frequency indicator of the base station during normal operation, but also provide effective counting data to the device manufacturers by collection the location information and production batch information about the base station element node so as to track the quality situation of the devices thereof after production for a long time.

In the base station system, the present invention can provide an intelligent and real-time improvement method for a radio frequency performance which changes randomly and dynamically with the external environment over time, and can provide effective counting data to device manufacturers on the basis of the above so as to track the quality status of the devices thereof after production for a long time.

DETAILED DESCRIPTION OF EMBODIMENTS

A detailed description is given to the preferred embodiments of the invention with reference to the drawings. The preferred embodiments of the present invention are described for the purpose of explaining the present invention, not for limiting the present invention.

In the present invention, as to the real-time improvement method for a distributed network radio frequency performance, real-time improvement can be realized by taking output power of a base station as an example, and the real-time improvement on the radio frequency performance can also be realized by collecting other parameters and by way of a model method in the present invention.

Figure 1:
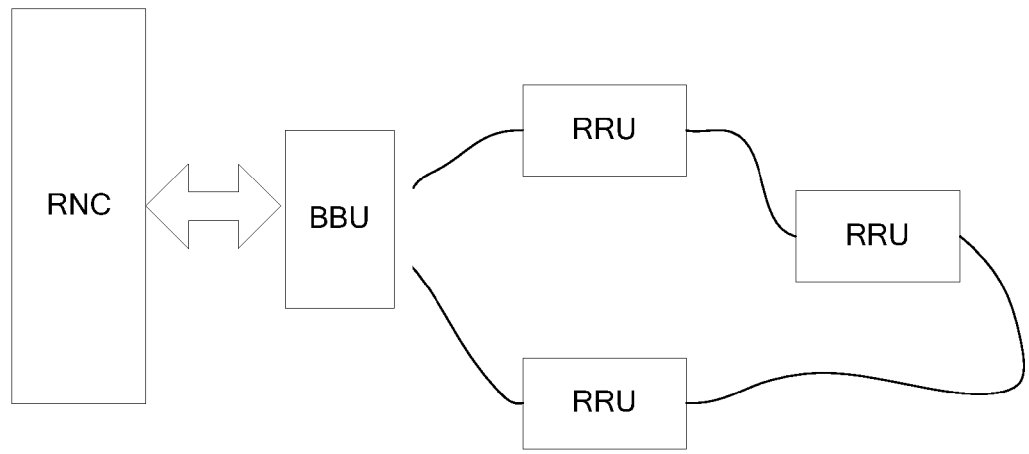
FIG. 1 is a schematic diagram of an existing distributed networking scenario.
Figure 2:
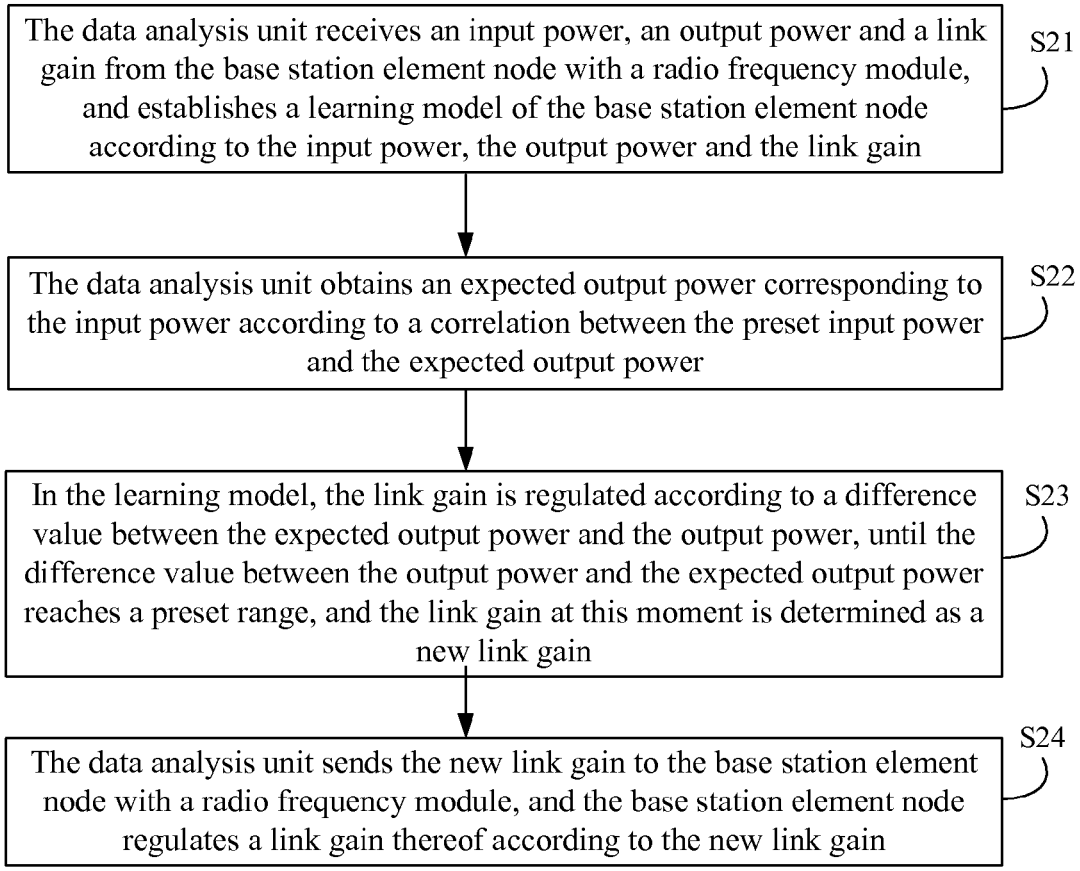
FIG. 2 is a flowchart of carrying out real-time improvement on a radio frequency performance by way of power adjustment in the present invention.

In the present invention, the link gain of a base station element node is adjusted by collecting the power information about the base station element node with a radio frequency module, so as to carry out real-time improvement on the radio frequency performance of the base station element node, and the particular steps thereof are as shown in FIG. 2.

S21, a data analysis unit receives an input power, an output power and a link gain from the base station element node with the radio frequency module, and establishes a learning model of the base station element node according to the input power, output power and link gain;

S22, the data analysis unit obtains an expected output power corresponding to the input power according to a correlation between the preset input power and the expected output power;

S23, in the learning model, the link gain is regulated according to a difference value between the expected output power and the output power, until the difference value between the output power of the learning model and the expected output power reaches a preset range, and the link gain at this moment is determined as a new link gain; and S24, the data analysis unit sends the new link gain to the base station element node with a radio frequency module, and the base station element node regulates a link gain thereof according to the new link gain.

The above steps are the real-time adjustment process of the base station element node with a radio frequency module, and in Step S21 of this real-time adjustment process, the data analysis unit can also collect the connection location relationship information and node production batch information about the base station element node with a radio frequency module, so as to carry out quality tracking on the base station element node.

After S24, the base station element node with a radio frequency module regulates the link gain according to the new link gain.

The data analysis unit continues to receive the new output power outputted by the base station element node after regulating the link gain. The data analysis unit compares and analyzes the difference value between the new output power and the expected output power, and if the difference value is within the preset range, then the data analysis unit updates the power sample information and the corresponding link gain parameter stored by the base station according to the collected connection location relationship information and production batch information about the base station element node. Then, a counting unit performs quality tracking on the base station element node by counting the change situation of the link gain parameter of the base station element node in every production batch.

Figure 3:
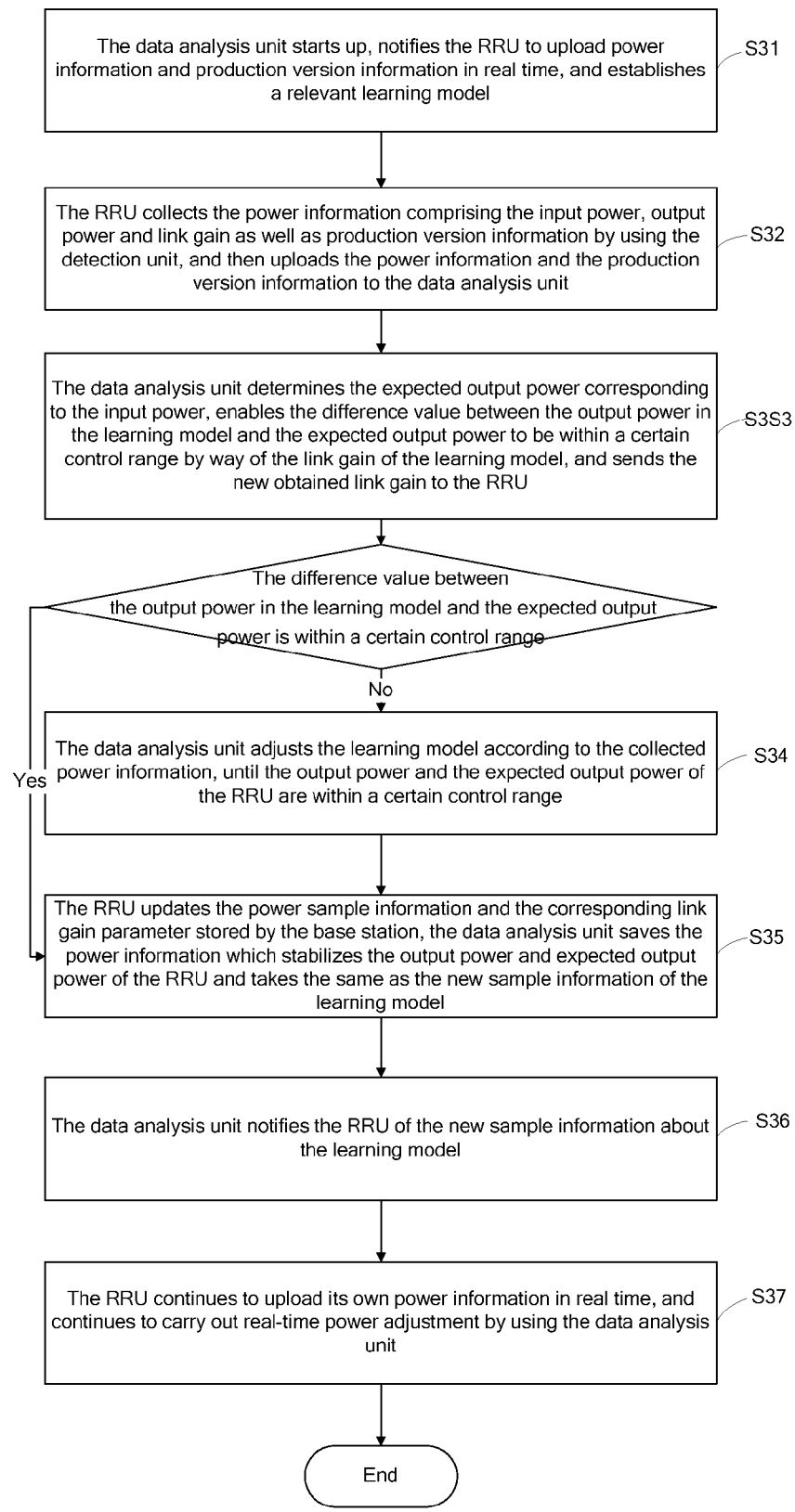
FIG. 3 is a block diagram of a processing flow of carrying out real-time improvement on a radio frequency performance by way of power adjustment in the present invention.

In this case, the base station element node with a radio frequency module can be an RRU comprising a detection unit and a gain regulation unit or another element node with a radio frequency component, and for clearly describing the real-time adjustment process of this method, the intelligent and real-time improvement method for radio frequency of this model will be described in detail by collecting and processing the power of the RRU including the detection unit and the gain regulation unit, and the particular flow processing diagram of the present invention is as shown in FIG. 3.

S31, the data analysis unit starts up, notifies the RRU to upload power information comprising the input power, output power and link gain as well as production version information in real time, and establishes the learning model relevant to the input power, output power and link gain of the RRU.

S32, the RRU collects the power information comprising the input power, output power and link gain as well as the production version information by using the detection unit, and then uploads the power information and the production version information to the data analysis unit.

S33, after acquiring the power information uploaded by the RRU, the data analysis unit first determines the expected output power corresponding to the input power, takes the difference value between the output power in the learning model and the expected output power as a control target, and enables the difference value between the output power in the learning model and the expected output power to be within a certain control range by regulating the link gain of the learning model in the data analysis unit. Since the new link gain and new output power obtained in the learning model are not the real link gain and output power of the RRU itself, the new obtained link gain has to be sent to the RRU for real regulation.

S34, if after the new link gain is regulated by the RRU, the output power and the expected output power are not within the control range, then the data analysis unit adjusts the learning model according to the collected power information, until the output power and the expected output power of the RRU are within the control range.

S35, if after the new link gain regulation of the RRU, the output power and the expected output power are within the control range, then the RRU updates the power sample information and the corresponding link gain parameter stored by the base station, and the data analysis unit saves the power information which stabilizes the output power and expected output power of the RRU and takes the output power and expected output power as the new sample information about the learning model.

S36, the data analysis unit notifies the RRU of the new sample information about the learning model.

Herein, the data analysis unit sends the determined new link gain to the RRU, and the RRU initiates the gain regulation unit to regulate the downlink radio frequency gain according to the new link gain value.

S37, the RRU continues to upload its own power information in real time, and continues to carry out real-time power adjustment by using the data analysis unit.

Figure 4:
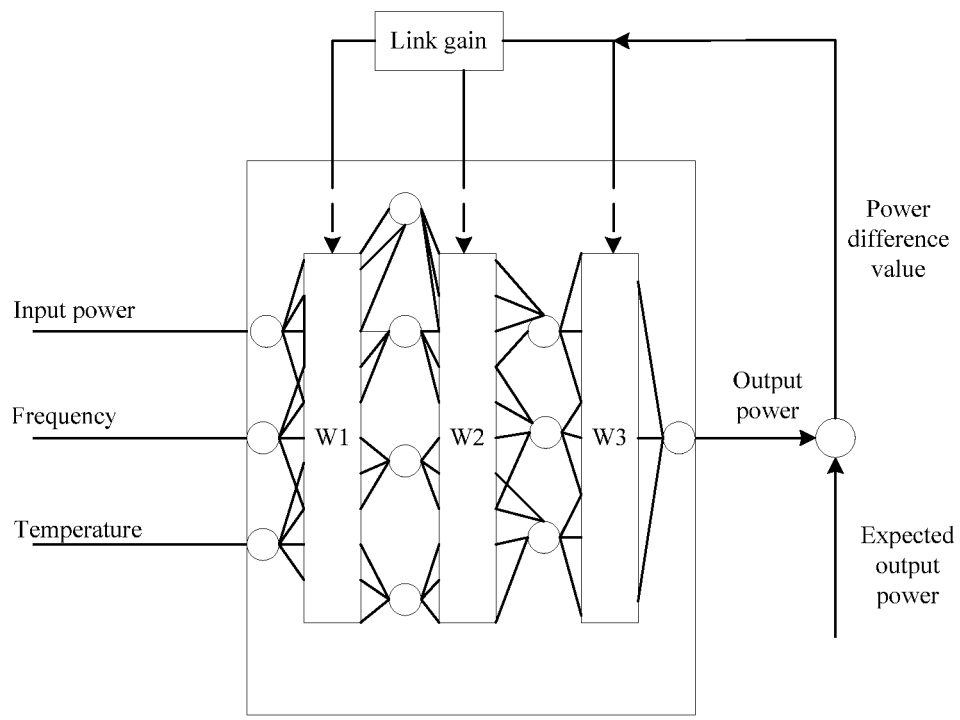
FIG. 4 is a processing frame diagram of a learning model in the present invention.

In S33, a structure frame diagram of a processing of the learning model of the data analysis unit according to information such as the received input power, output power, link gain, etc. is as shown in FIG. 4, wherein the learning model of the data analysis unit selects three input parameters: input power, configuration frequency and ambient temperature and can also merely collect one or more other input parameters, and the output parameter thereof is output power.

The expected output power under the input parameter is determined according to the input parameters, i.e. the output power, the configuration frequency and the ambient temperature.

For clearly embodying that the input sample does not have linear separability, the learning model further has an intermediate layer simulating a complicated nonlinear function relationship in addition to comprising an input layer and an output layer, wherein W1, W2 and W3 are the weight coefficients of the layers respectively, and the initial weight coefficient can be obtained by learning the power parameters previously stored in the base station by the RRU; when the output power of the learning model is greater than the expected output power by a certain control range, an online learning process will be initiated, the link gain in the learning model can be regulated and the weight of each layer can be updated, until the difference value between the output power and the expected output power is within a certain control range.

In S35, the counting unit can count a fluctuation situation of the link gain of the RRU under a certain production batch so as to make it convenient for device manufacturers to track product quality.

According to another aspect of the present invention, the present invention also provides a real-time improvement apparatus for a distributed network radio frequency performance, wherein the apparatus mainly comprises: a data analysis unit, wherein the data analysis unit can be arranged flexibly. The data analysis unit can be provided in the RRU or BBU or designed separately, and the present embodiment will describe the data analysis unit in the manner of separate design, wherein the data analysis unit comprises a receiving module, a determination module, a regulation module and a sending module, wherein the receiving module is configured to receive an input power, an output power and a link gain from a base station element node with a radio frequency module, and establish a learning model of the base station element node according to the input power, output power and link gain;

the determination module is configured to obtain an expected output power corresponding to the input power received by the receiving module according to a correlation between a preset input power and the expected output power;

the regulation module is configured to, in the learning model established by the receiving module, regulate the link gain of the base station element node according to a difference value between the expected output power and the output power, until the difference value between the output power of the learning model and the expected output power reaches a preset range, and the link gain at this moment is determined as a new link gain; and the sending module is configured to, send the new link gain determined by the regulation unit to the base station element node with a radio frequency module, and the base station element node regulates a link gain thereof according to the new link gain.

The present invention further comprises a counting unit, configured to perform quality tracking on the base station element node by counting the change situation of the link gain parameter of the base station element node in each production batch. The counting unit can be embodied by a separate server and can access the base station via a network interface or other communication means.

Figure 5:
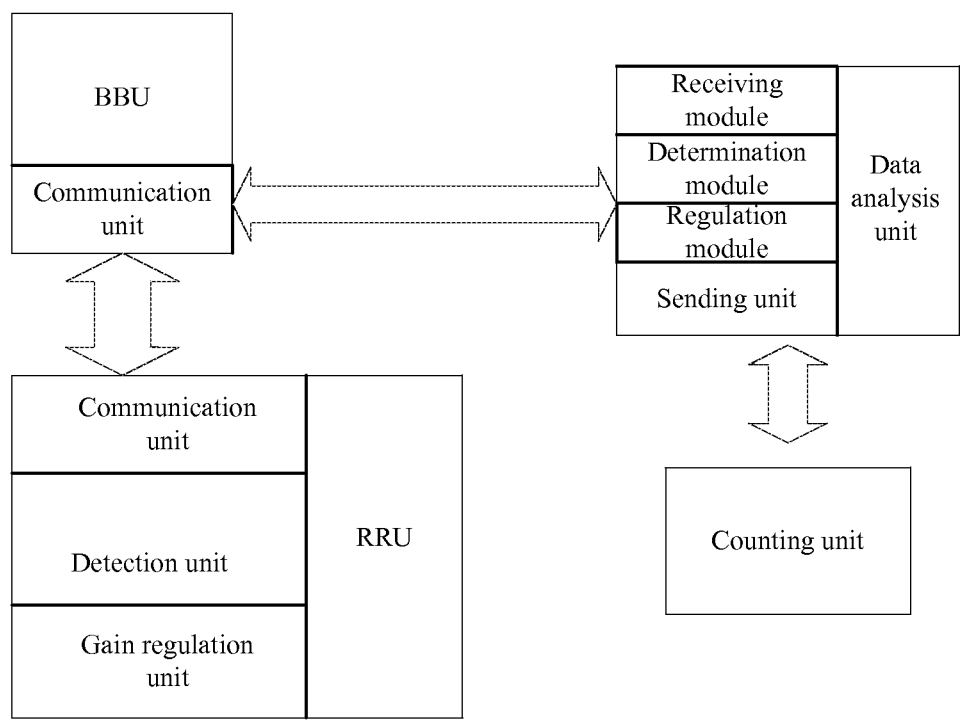
FIG. 5 is a block diagram of an operation of a real-time improvement apparatus for a radio frequency performance in the present invention.

As shown in FIG. 5, first, the RRU detects and collects the power information about a node such as the input power, the output power, the link gain, etc. by way of its own detection unit, and then reports the power information to the data analysis unit by way of its own communication unit in real time; the data analysis unit receives the power information reported by the RRU by way of its own receiving module and establishes a relevant learning model, determines the expected output power corresponding to the input power by way of its own determination module, then regulates the power information in the learning model by way of its own regulation module, finally determines a new link gain, and sends the new determined link gain to the RRU by way of its own sending module; and the RRU regulates the downlink radio frequency gain by using its own gain regulation unit.

After regulating the downlink gain component, the RRU sends the new power information to the data analysis unit, and if the new output power in the new power information and the expected output power are stable, the RRU updates the power sample information and the corresponding link gain parameters of the base station element node stored by the base station, and finally the counting unit tracks the quality of the base station element node according to the change situation of the link gain parameters of the base station element node for a long time.

The above is a further detailed description of the present invention in conjunction with particular embodiments, and the particular embodiments of the present invention shall not be deemed as being limited to such description. Several simple deductions or replacements made by those skilled in the art without departing from the concept of the present invention shall be viewed as belonging to the scope of protection of the present invention.

What is claimed is:

1. A real-time improvement method for a distributed network radio frequency performance, comprising the real-time steps of:

receiving, by a data analysis unit, an input power, an output power and a link gain from a base station element node with a radio frequency module, and establishing a learning model of the base station element node according to the input power, the output power and the link gain;

obtaining, by the data analysis unit, an expected output power corresponding to the input power according to a correlation between a preset input power and the expected output power;

in the learning model, regulating the link gain according to a difference value between the expected output power and the output power, until the difference value between the output power of the learning model and the expected output power reaches a preset range, and determining the link gain at this moment as a new link gain; and sending, by the data analysis unit, the new link gain to the base station element node with a radio frequency module, and regulating, by the base station element node, a link gain of the base station element node according to the new link gain.

2. The real-time improvement method for a distributed network radio frequency performance according to claim 1, wherein the base station element node with the radio frequency module is a Radio Remote Unit (RRU) comprising a detection unit and a gain regulation unit; and establishing the learning model of the base station element node comprises: detecting and collecting, by the RRU, the input power, the output power and the link gain by way of the detection unit and sending the input power, the output power and the link gain to the data analysis unit; and establishing, by the data analysis unit, the learning model of the RRU comprising an input layer, an intermediate layer and an output layer according to the input power, the output power and the link gain of the RRU.

3. The real-time improvement method for a distributed network radio frequency performance according to claim 2, wherein determining the new link gain comprises:

if the difference value between the output power and the expected output power in the learning model is not within a preset range, then regulating the link gain in the learning model and updating the node weights of the input layer, the intermediate layer and the output layer in the learning model, until the difference value between the output power and the expected output power in the learning model is within the preset range, and determining the link gain at this moment as the new link gain.

4. The real-time improvement method for a distributed network radio frequency performance according to claim 3, wherein regulating the link gain of the base station element node according to the new link gain comprises:

sending, by the data analysis unit, the determined new link gain to the RRU, and initiating, by the RRU, a gain regulation unit to regulate a downlink radio frequency gain according to a value of the new link gain.

5. The real-time improvement method for a distributed network radio frequency performance according to claim 1, further comprising:

collecting, by the data analysis unit, connection location relationship information and node production batch information about the base station element node with the radio frequency module.

6. The real-time improvement method for a distributed network radio frequency performance according to claim 5, after determining the new link gain, further comprising:

regulating, by the base station element node with the radio frequency module, the link gain according to the new link gain; and receiving, by the data analysis unit, a new output power of the base station element node, and comparing and analyzing a difference value between the new output power and the expected output power, and if the difference value is within a preset range, then updating, by the data analysis unit, power sample information and a corresponding link gain parameter of the base station element node stored by the base station according to the connection location relationship about the base station element node.

7. The real-time improvement method for a distributed network radio frequency performance according to claim 6, after if the difference value is within the preset range, then updating the power sample information and the corresponding link gain parameter of the base station element node stored by the base station according to the connection location relationship about the base station element node, further comprising:

performing, by a counting unit, quality tracking on the base station element node by counting a change situation of the link gain parameter of the base station element node in each production batch.

8. A real-time improvement apparatus for a distributed network radio frequency performance, comprising a hardware processor and software program units, wherein the hardware processor is configured to execute the software program units, and the software program units comprise:

a data analysis unit comprising a receiving module, a determination module, a regulation module and a sending module, wherein operations executed by the software program units are real-time, and the receiving module is configured to receive an input power, an output power and a link gain from a base station element node with a radio frequency module, and establish a learning model of the base station element node according to the input power, the output power and the link gain;

the determination module is configured to obtain an expected output power corresponding to the input power received by the receiving module according to a correlation between a preset input power and the expected output power;

the regulation unit, is configured to, in the learning model established by the receiving module, regulate the link gain according to a difference value between the expected output power and the output power obtained by the determination module, until the difference value between the output power of the learning model and the expected output power reaches a preset range, and the link gain at this moment is determined as a new link gain; and the sending module is configured to send the new link gain determined by the regulation unit to the base station element node with a radio frequency module, which regulates a link gain of the base station element node according to the new link gain.

9. The real-time improvement apparatus for a distributed network radio frequency performance according to claim 8, the software program units further comprises: a counting unit, configured to perform quality tracking on the base station element node by counting a change situation of the link gain parameter of the base station element node in each production batch.

* * * * *